Patented Jan. 8, 1929.

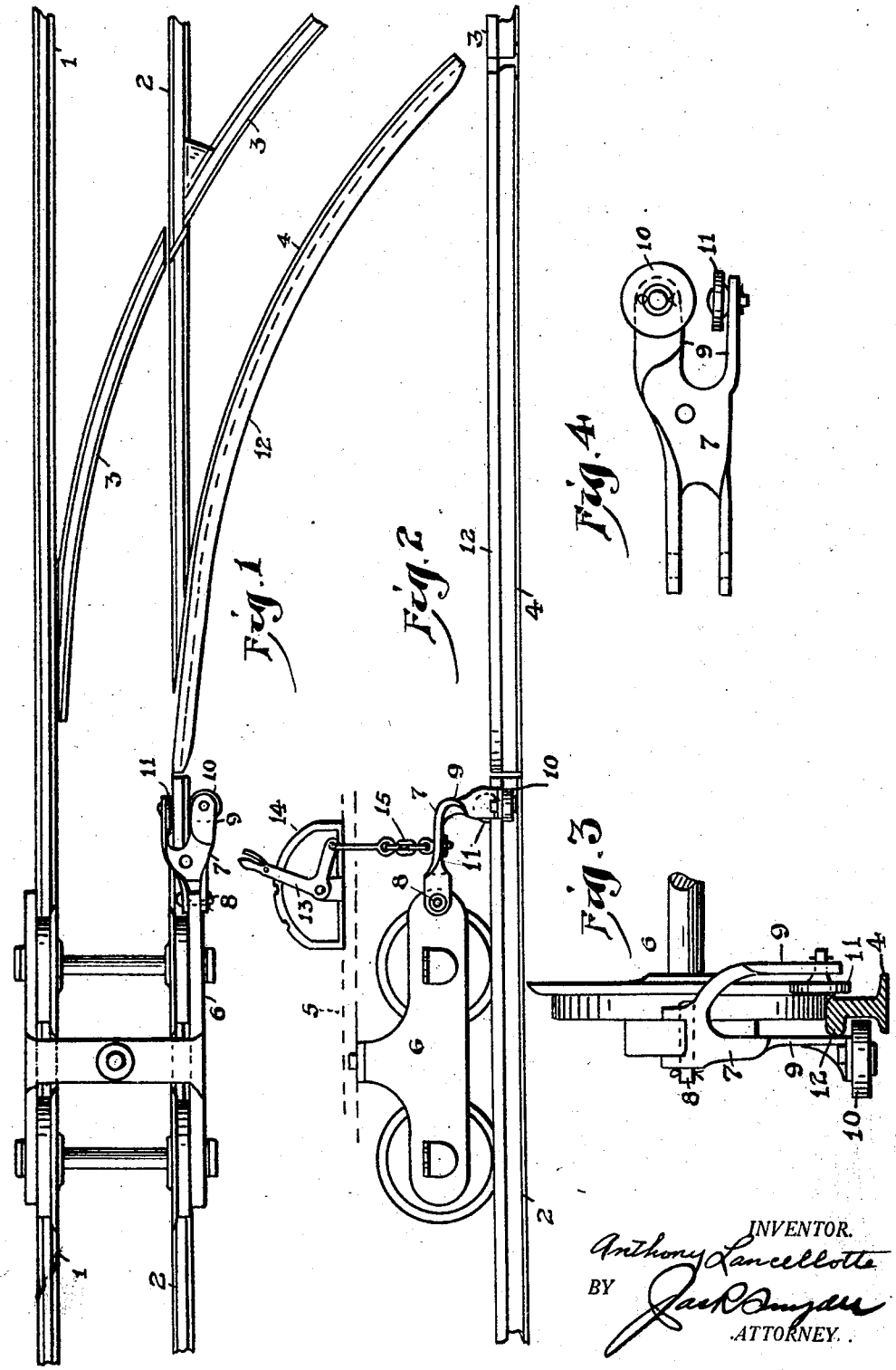

1,697,922

UNITED STATES PATENT OFFICE.

ANTHONY LANCELLOTTE, OF PITTSBURGH, PENNSYLVANIA.

CAR-SWITCHING APPARATUS.

Application filed February 8, 1928. Serial No. 252,886.

My invention relates to a car switching apparatus of the type disclosed in my co-pending application for Letters Patent of the United States, bearing filing date the 16th day of March, 1927, and Serial No. 175,760, and while primarily intended for street railways, it will be obvious that the device may be employed in connection with any class of rail road where it is found to be applicable.

Important objects of the invention are to provide a switching apparatus of the class described, which is carried by the car and operated and controlled by the car operator from his cab, which entirely eliminates all movable parts of the track rails in transferring a car from one track to another and which may be readily installed to any type of modern street car without change to the latter or without the use of additional materials except that embodied in the invention itself.

Further objects of the invention are to provide a device of the type stated which is simple in its construction and arrangement, strong, durable and efficient in its use, conveniently operable, positive in its action and comparatively inexpensive to manufacture, install and maintain.

With the foregoing and other objects in view which will appear as the description proceeds, the invention resides in the combination and arrangement of parts and in the details of construction hereinafter described and claimed, it being understood that changes in the precise embodiment of the invention hereinafter disclosed can be made within the scope of what is claimed without departing from the spirit of the invention.

In the drawing wherein like numerals of reference designate corresponding parts throughout the several views:—

Figure 1 is a top plan view of my improved switching apparatus connected to a car truck and mounted on a railway.

Figure 2 is a side view thereof.

Figure 3 is a front view of the device in the engaging position.

Figure 4 is a bottom plan view of the device.

Referring in detail to the drawing 1 and 2 denote the rails of the main railway, and 3 and 4 represent the rails of an adjoining side railway. A car 5, including a swivelled truck 6, of the usual construction, is mounted on the rails 1 and 2, of the main railway.

The present invention comprises, a supporting frame 7, which has its rear end pivotally connected, as at 8, to the forward end of the car truck 6. The supporting frame 7 is formed, at its forward end, with a bifurcated depending portion 9, which carries a pair of spaced, rotatably mounted wheels, respectively indicated at 10 and 11. The wheel 10 is disposed horizontally edgewise and the wheel 11 is disposed vertically edgewise, and the former is positioned outwardly with respect to the latter.

In the use of my improved switching apparatus a special outer rail 4 is required at the adjoining terminal of the side railway. The rail 4 is formed with a top flange 12, which projects laterally outward to a greater distance than the entire side edge of head of the rails that form the railways.

When the switching apparatus is in the engaging position, as clearly shown in Figure 3, the outer, horizontally disposed wheel 10 engages the outer side of the rail 4 beneath the top flange 12, and the side of the inner, vertically disposed wheel 11 operates against the inner straight side of the rail 4. When the rail 4 is so engaged by the wheels 10 and 11, the device cannot leave the former until the latter clears the same.

An operating lever 13, provided with a holding mechanism 14, is mounted on the railway car 5. A chain 15 connects the supporting frame 7 with operating lever 13. The movement of the latter in one direction will elevate the device from its engagement with the railway, while the movement in the other direction will permit of the engagement of the device with the rails when effecting a turn from one rail to another.

In practice, the operation of my improved car switching apparatus is as follows:— When the car approaches a side railway on which it is to travel, the operator will lower the supporting frame 7 whereby the rail 4, of the side railway, will be engaged by the wheels 10 and 11. As the supporting frame 7 is connected to the car truck 6, the latter will be shifted and lead, on its swivelled connection with the car, to follow the rails 3 and 4 of the side railway. After the car has entered the side railway, and clears the special rail 4, the device is elevated to the inoperative position by the operator. The length of the special rail 4 is only sufficient to effect the travel of the car from one railway to an adjoining side railway.

It will, of course, be obvious that it would be necessary to provide both sides of the car with a switching apparatus to permit of turns in opposite directions. Further, it will be obvious that minor details of construction of the device may be resorted to without departing from the spirit of the invention.

The use of my improved switching apparatus entirely eliminates the usual movable rail parts in effecting the transfer of a car from one railway to an adjoining railway, and provides a durable and inexpensive car transfer device.

What I claim is:

1. A switching apparatus for a railway car comprising a switching element projecting outwardly from and pivotally connected for vertical movement to the swivelled truck of the railway car, said element including a pair of spaced rotatable members engaging respective sides of a rail of an adjoining railway for shifting said truck to direct the travel of the railway car from one railway to the adjoining railway.

2. A switching apparatus for a railway car comprising a switching element projecting outwardly from and pivotally connected for vertical movement to the swivelled truck of the railway car, said element including a pair of spaced rotatable members engaging respective sides of a rail of an adjoining railway for shifting said truck to direct the travel of the railway car from one railway to the adjoining railway, one of said pair of rotatable members being disposed horizontally and the other of said pair of rotatable members being disposed vertically.

3. A switching apparatus for a railway car comprising a switching element projecting outwardly from and pivotally connected for vertical movement to the swivelled truck of the railway car, said element including a pair of spaced rotatable members engaging respective sides of a rail of an adjoining railway for shifting said truck to direct the travel of the railway car from one railway to the adjoining railway, and means for shifting and maintaining said switching element in the operative or inoperative position.

4. A switching apparatus for a railway car comprising a switching element projecting outwardly from and pivotally connected for vertical movement to the swivelled truck of the railway car, said element including a pair of spaced rotatable members engaging respective sides of a rail of an adjoining railway for shifting said truck to direct the travel of the railway car from one railway to the adjoining railway, one of said pair of rotatable members being disposed horizontally and the other of said pair of rotatable members being disposed vertically, and means for shifting and maintaining said switching element in the operative or inoperative position.

In testimony whereof I affix my signature.

ANTHONY LANCELLOTTE.